United States Patent
Liotta et al.

(10) Patent No.: US 6,585,482 B1
(45) Date of Patent: Jul. 1, 2003

(54) METHODS AND APPARATUS FOR DELIVERING COOLING AIR WITHIN GAS TURBINES

(75) Inventors: Gary Charles Liotta, Beverly, MA (US); Robert Francis Manning, Newburyport, MA (US); Robert John Parks, Ipswich, MA (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/597,183

(22) Filed: Jun. 20, 2000

(51) Int. Cl.[7] .................................................. F01D 1/00

(52) U.S. Cl. ............................ 415/116; 415/144; 415/1

(58) Field of Search ................................. 415/144, 175, 415/206, 176, 224.5, 178, 115, 116, 117, 108; 416/95, 96 R, 97 R

(56) References Cited

U.S. PATENT DOCUMENTS

| | | | | |
|---|---|---|---|---|
| 5,555,721 A | * | 9/1996 | Bourneuf et al. | 60/39.75 |
| 5,575,616 A | | 11/1996 | Hagle et al. | |
| 6,035,627 A | | 3/2000 | Liu | 60/39.07 |
| 6,050,079 A | * | 4/2000 | Durgin et al. | 415/115 |
| 6,227,801 B1 | * | 5/2001 | Liu | 415/117 |

\* cited by examiner

Primary Examiner—Edward K. Look
Assistant Examiner—Richard A. Edgar
(74) Attorney, Agent, or Firm—Nathan D. Herkamp; Armstrong Teasdale LLP; Robert B. Reeser, III

(57) ABSTRACT

A gas turbine engine includes a compressor rotor assembly which directs air at a sufficient pressure and temperature to a downstream turbine for cooling. The compressor assembly includes a compressor including an impeller and a cooling circuit. The impeller includes an exit, an inlet, and a body extending therebetween. The impeller body includes a first opening positioned a distance from the impeller exit. The cooling circuit extends between the compressor and the turbine and is in flow communication with the impeller opening.

20 Claims, 3 Drawing Sheets

METHODS AND APPARATUS FOR DELIVERING COOLING AIR WITHIN GAS TURBINES

GOVERNMENT RIGHTS STATEMENT

The United States Government has rights in this invention pursuant to Contract No. DAAH10-98-C-0023.

BACKGROUND OF THE INVENTION

This application relates generally to gas turbine engines and, more particularly, to gas turbine engine compressors.

A gas turbine engine typically includes a multi-stage axial compressor, a combustor, and a turbine. Airflow entering the compressor is compressed and directed to the combustor where it is mixed with fuel and ignited, producing hot combustion gases used to drive the turbine. As a result of the hot combustion gases entering the turbine, typically compressor air is channeled through a turbine cooling circuit and used to cool the turbine.

Compressor bleed air is often used as a source of cooling air for the turbine cooling circuit. However, extracting cooling air from the compressor may affect overall gas turbine engine performance. To minimize a reduction in engine performance, the cooling air is typically extracted from the lowest compressor stage that has a sufficient pressure for the turbine. Generally, because the temperature of air flowing through the compressor increases at each stage of the compressor, utilizing cooling air from the lowest allowable compressor stage results in a lower engine performance decrement as a result of such a cooling air extraction. Furthermore, the turbine is cooled more effectively when the cooling air is extracted from a source having a lower temperature. However, in gas turbine engines including radial outflow compressors or centrifugal compressors, cooling air is typically extracted at an inlet and/or exit of the centrifugal compressor. Cooling air extraction from the exit of the centrifugal compressor is often at a higher pressure level than needed for turbine cooling. An associated engine performance loss results from utilizing cooling air at such an excessive pressure level because additional work was done to compress such air and further because such air is at a higher temperature level. As a result, overall engine performance is affected and the turbine is cooled ineffectively.

BRIEF SUMMARY OF THE INVENTION

In an exemplary embodiment, a gas turbine engine includes a compressor rotor assembly which effectively directs air downstream at a sufficient pressure and temperature to a downstream turbine for cooling. The compressor assembly includes a centrifugal compressor including an impeller, an impeller shroud/casing, and a cooling circuit. The centrifugal compressor includes an inlet, an exit, and a flowpath extending therebetween and defined by the rotating impeller and the non-rotating impeller shroud/casing. The impeller shroud includes a first opening that is positioned between the centrifugal compressor inlet and exit. The cooling circuit extends between the compressor and the turbine and is in flow communication with the impeller shroud opening.

In operation, compressor bleed air is extracted from the centrifugal compressor through the first opening. The air is channeled to the turbine and a portion of the air is directed radially inward to cool a shroud covering a portion of the turbine and a portion is directed upstream to cool a disk of the turbine. The cooling circuit extracts cooling air from the compressor at a location which provides cooling air at a temperature which effectively cools the turbine and at a pressure greater than a static pressure level in those regions cooled within the turbine by the cooling circuit. As a result, the turbine is effectively cooled to improve mechanical capability and durability of the turbine.

DETAILED DESCRIPTION OF THE INVENTION

Figure 1:
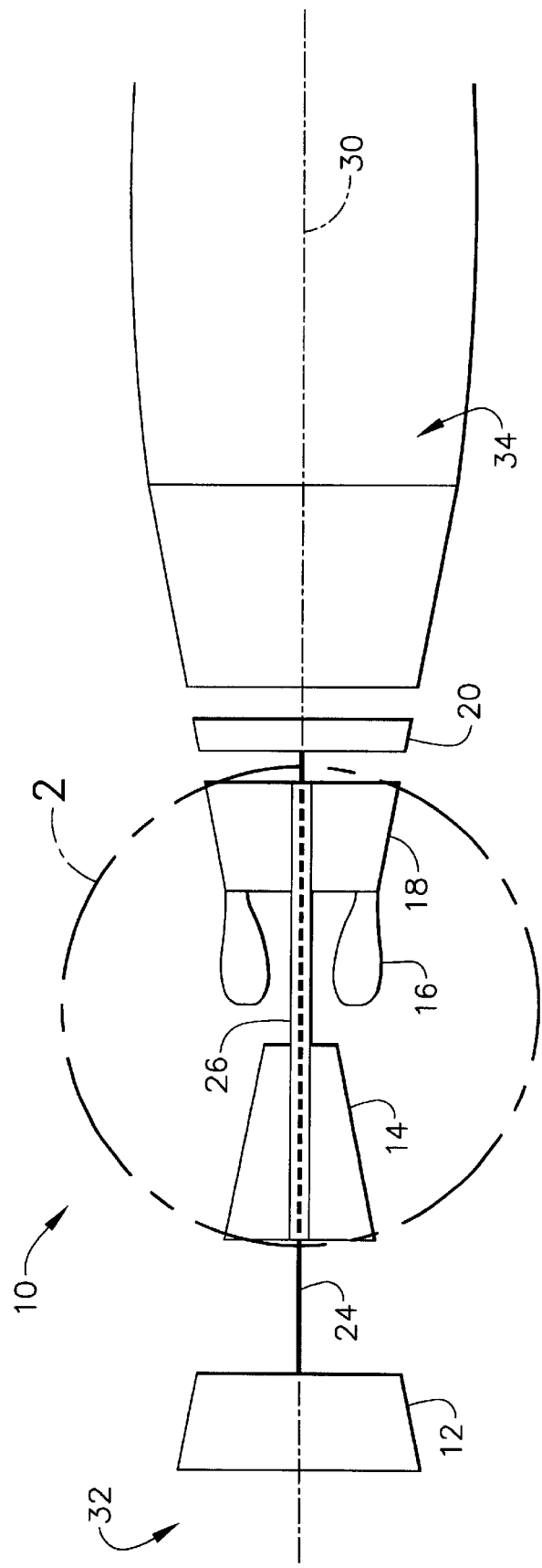
FIG. 1 is a schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18, and a low pressure turbine 20. Compressor 12 and turbine 20 are coupled by a first shaft 24, and compressor 14 and turbine 18 are coupled by a second shaft 26. Engine 10 has an axis of symmetry 30 extending from an inlet side 32 of engine 10 aftward to an exhaust side 34 of engine 10. Shafts 24 and 26 rotate about axis of symmetry 30. In one embodiment, engine 10 is a JTAGG III engine available from General Electric Aircraft Engines, Cincinnati, Ohio. Alternatively, engine 10 is a T700/CT7 engine available from General Electric Aircraft Engines, Cincinnati, Ohio.

In operation, air flows through low pressure compressor 12 from an inlet side 32 of engine 10 and compressed air is supplied from low pressure compressor 12 to high pressure compressor 14. Compressed air is then delivered to combustor 16 and airflow from combustor 16 drives turbines 18, and 20.

Figure 2:
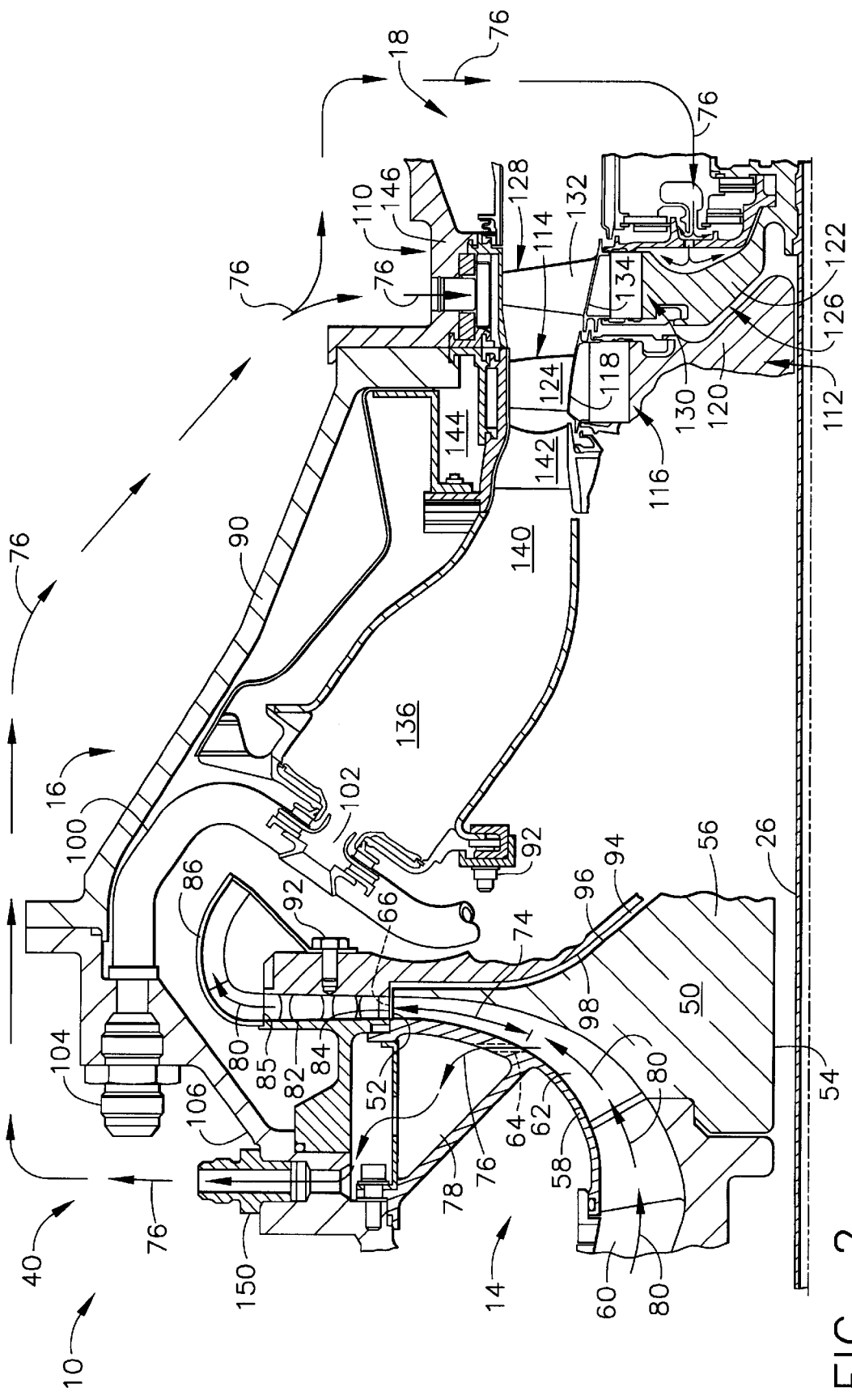
FIG. 2 is a side cross-sectional schematic illustration of the gas turbine engine shown in FIG. 1 taken along area 2 and including a turbine cooling circuit.

FIG. 2 is a side cross-sectional schematic illustration of a portion of gas turbine engine 10 taken along area 2 shown in FIG. 1 including compressor 14, combustor 16, and a cooling circuit 40. Compressor 14 includes a plurality of blades (not shown) and a centrifugal compressor, or impeller 50. Centrifugal compressor 50 extends aftward from compressor 14 downstream of the blades and includes an exit 52, a hub 54, and a rotating impeller body 56 extending therebetween. Centrifugal compressor 50 also includes a non-rotating impeller shroud 58. In one embodiment, impeller 50 is a single stage centrifugal impeller.

Impeller body 56 and impeller shroud 58 extend radially outward from an inlet 60 to exit 52 in a frusto-conical shape and includes a chamber 62, a first opening 64, and a second opening 66. Impeller hub 54 is coupled circumferentially to rotor shaft 26. First opening 64 is in flow communication with cooling circuit 40 and is sometimes known as an impeller forward mid diffuser feed hole. Impeller first opening 64 is positioned within impeller shroud 58 a radial distance 74 upstream from impeller exit 52 and permits first cooling circuit bleed air 76 to exit chamber 62 substantially perpendicularly to rotor shaft 26 into a manifold 78. Radial distance 74 varies in different embodiments of engine 10 based on pressure level requirements for turbine 18. First opening 64 permits cooling circuit 40 to recover a portion of air velocity head from inlet air 80 entering compressor 14. Radial distance 74 is chosen to optimize the amount of air velocity head recovered, such that the pressure recovered through impeller first opening 64 is greater than a static pressure level in those regions cooled within turbine 18 by cooling circuit 40. Manifold 78 is annular and circumferentially surrounds rotor shaft 26. Manifold 78 is in flow communication with first opening 64 and is disposed adjacent impeller body 56 upstream from impeller exit 52.

Second opening 66 is disposed adjacent impeller exit 52 and permits impeller chamber 62 to be in flow communication with a diffuser 82. Diffuser 82 is positioned radially outward from centrifugal compressor 50 and includes an inlet 84 and an outlet 85. Inlet 84 is adjacent impeller second opening 66 and permits inlet air 80 to exit impeller 50 serially into diffuser 82. A deswirl cascade 86 is in flow communication with diffuser 82 and extends from diffuser outlet 85.

Combustor 16 is positioned downstream from centrifugal compressor 50 and includes a casing 90. A plurality of fasteners 92 secure combustor 16 to engine 10 between compressor 14 and turbine 18. Combustor 16 is disposed within combustor casing 90 and mounted to diffuser 82 with fasteners 92 such that a gap 94 is created between an impeller backwall 96 and a combustor casing endwall 98. Combustor 16 includes a plurality of fuel nozzles 100 which extend from an inlet side 102 of combustor 16 to a plurality of couplings 104. Couplings 104 extend through a compressor casing 106 and anchor fuel nozzles 100 within engine 10.

High pressure turbine 18 is coupled coaxially with compressor 14 downstream from combustor 16 and includes a stator assembly 110 and a rotor assembly 112. Rotor assembly 112 may include a plurality of rotors 114 formed by one or more disks 116. In one embodiment, disk 116 includes a radially outer rim 118, a radially inner hub 120, and an integral web 122 extending radially therebetween. Each disk 116 also includes a plurality of blades 124 extending radially outward from outer rim 118. Disk 116 extends circumferentially around rotor assembly 112 and each row of blades 124 is sometimes referred to as a turbine stage.

Low pressure turbine 20 is coupled similarly to compressor 12 (shown in FIG. 1) and includes a stator assembly (not shown) and a rotor assembly 126. Rotor assembly 126 may include a plurality of rotors 128 formed by one or mores disks 130. Each disk 130 includes a plurality of blades 132 extending radially outward from an outer rim 134. Disk 130 extends circumferentially around rotor assembly 126 and each row of blades 132 is sometimes referred to as a turbine stage.

High pressure turbine 18 is in flow communication with combustor 16. Combustor 16 includes an annular combustion zone 136 extending from inlet side 102 of combustor 16 to an outlet side 140 of combustor 16. Combustor outlet side 140 is positioned adjacent a high pressure turbine nozzle 142. High pressure turbine nozzle 142 and high pressure turbine disk blades 124 are disposed within a high pressure turbine shroud 144 and the low pressure turbine disk blades 132 are disposed in a low pressure turbine shroud 146. Shrouds 144 and 146 channel hot combustion gases from combustor 16 through turbine 18 and 20.

Cooling circuit 40 is in flow communication with both centrifugal compressor 50 and turbine 20 and supplies bleed air from compressor 14 to cool turbine 20. Cooling circuit 40 includes a plurality of piping (not shown) extending between compressor 14 and turbine 20. A coupling 150 permits the cooling circuit piping to attach to compressor 14 in flow communication with manifold 78 and impeller first opening 64. The cooling circuit piping extends between compressor 14 and turbine 20 and permits a portion of bleed air 76 to be directed radially inward towards low pressure turbine shroud 146 and a portion of bleed air 76 to be directed upstream axially towards low pressure turbine disk 130.

During operation, inlet air 80 enters compressor 12 and is compressed by the plurality of compressor stages prior to entering centrifugal compressor 50. Compressed inlet air 80 enters impeller chamber 62 and is channeled towards impeller second opening 66 and diffuser 82. Air exiting diffuser 82 passes serially through deswirl cascade 86 into combustor casing 90 where it is mixed with fuel provided by fuel nozzles 100 and ignited within annular combustion zone 136 to produce hot combustion gases. The resulting hot combustion gases drive turbines 18 and 20. Simultaneously, a portion of inlet air 80 is extracted from compressor chamber 62 to first cooling circuit 40.

Inlet air 80 extracted by first cooling circuit 40 exits impeller chamber 58 through impeller first opening 64. First opening 64 is upstream from second opening 66 radial distance 74 such that cooling circuit 40 recovers a portion of air velocity head from inlet air 80. The recovered portion has a pressure used by cooling circuit 40 is greater than a gas path static pressure level in those regions cooled within turbine 20. Bleed cooling air 76 exits impeller first opening 64 into manifold 78. Manifold 78 collects cooling air 76 and provides a uniform, uninterrupted flow of cooling air 76 through first cooling circuit coupling 150 to cooling circuit 40. The cooling circuit piping channels cooling air 76 aftward to turbine 20. A portion of cooling air 76 is directed radially inward to cool turbine low pressure turbine shroud 146. Additionally, a portion of cooling air 76 is directed axially forward from the piping towards low pressure turbine disk 130 to cool low pressure turbine disk 130. Cooling air 76 reduces turbine 20 temperatures which improves mechanical capability and rotor durability. Because cooling air 76 is extracted from impeller first opening 64, cooling air 76 has a lower temperature than inlet air 80 exiting impeller second opening 66 and therefore provides increased cooling to turbine 20 in comparison to inlet air 80 exiting second opening 66. Furthermore, cooling air 76 extracted from first opening 64 has a smaller amount of work put into it by centrifugal compressor 50 than air 80 exiting second opening 66, resulting in lower engine performance loss.

Figure 3:
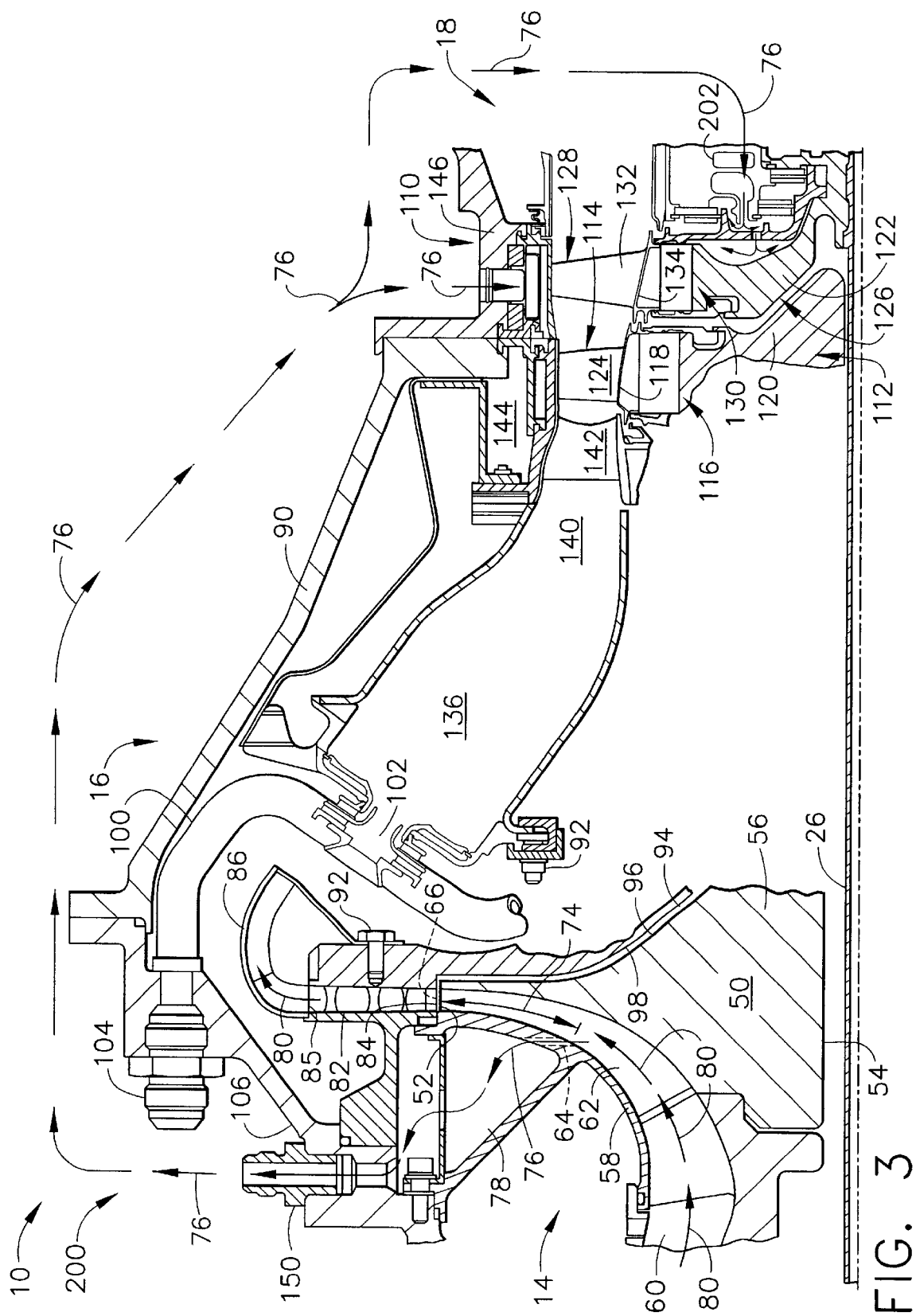
FIG. 3 is a side cross-sectional schematic illustration of the turbine cooling circuit shown in FIG. 2.

FIG. 3 is a side cross-sectional schematic illustration of gas turbine engine 10 including a cooling circuit 200. Cooling circuit 200 is in flow communication with both centrifugal compressor 50 and turbine 20 and supplies bleed air from compressor 14 to cool turbine 20. A plurality of piping (not shown) extends between compressor 14 and turbine 20 and permits cooling circuit 200 to attach to compressor 14 in flow communication with manifold 78 and impeller first opening 60. The cooling circuit piping extends between compressor 14 and turbine 20 and permits a portion of bleed air 76 to be directed radially inward towards low pressure turbine shroud 146 and a portion of bleed air 76 to be directed towards an accelerator 202. Accelerator 202 is positioned downstream from low pressure turbine disk 130 in flow communication with low pressure turbine disk 130 and is sometimes referred to as a tangential flow accelerator.

Accelerator 202 discharges cooling air onto low pressure turbine disk 130 at a high tangential speed approaching a rotational speed of low pressure turbine disk 130. Accelerator 202 is a series of orifices (not shown) substantially angled in such that airflow exiting accelerator 202 is directed in a direction of disk 130 rotation. In one embodiment, accelerator 202 is a nozzle ring. In an alternative embodiment, accelerator 202 is a plurality of round openings.

During operation, inlet air 80 enters compressor 12 (shown in FIG. 1) and is compressed by the plurality of compressor stages prior to entering centrifugal compressor 50. Compressed inlet air 80 enters impeller chamber 62 and is channeled towards impeller second opening 66 and diffuser 82. Air exiting diffuser 82 passes serially through deswirl cascade 86 into combustor casing 90 where it is mixed with fuel provided by fuel nozzles 94 and ignited within annular combustion zone 136 to produce hot combustion gases. The resulting hot combustion gases drive turbine 18 and 20. Simultaneously, a portion of inlet air 80 is extracted from compressor chamber 62 to first cooling circuit 40.

Inlet air 80 extracted by first cooling circuit 40 exits impeller chamber 58 through impeller first opening 64. First opening 64 is upstream from second opening 66 a distance 74 such that cooling circuit 40 recovers a portion of air velocity head from inlet air 80. The recovered portion has a pressure used by cooling circuit 40 is greater than a gas path static pressure level in those regions cooled within turbine 20. Bleed cooling air 76 exits impeller first opening 64 into manifold 78. Manifold 78 collects cooling air 76 and provides a uniform, uninterrupted flow of cooling air 76 through first cooling circuit coupling 150 to cooling circuit 40. The cooling circuit piping channels cooling air 76 aftward to turbine 20. A portion of cooling air 76 is directed radially inward to cool turbine low pressure turbine shroud 146. Additionally, a portion of cooling air 76 is directed into accelerator 202. Accelerator 202 discharges cooling air 76 onto low pressure turbine disk 130 at a high tangential speed. Cooling air 76 reduces turbine 20 temperatures which improves mechanical capability and rotor durability. Furthermore, because cooling air 76 is extracted from impeller first opening 64, cooling air 76 has a lower temperature than inlet air 80 exiting impeller second opening 66 and therefore provides increased cooling to turbine 18 in comparison to inlet air 80. Furthermore, cooling air 76 extracted from first opening 64 has a smaller amount of work put into it by centrifugal compressor 50 than air 80 exiting second opening 66, resulting in lower engine performance loss.

The above-described turbine cooling circuit is cost-effective and highly reliable. While the invention has been described in terms of various specific embodiments, those skilled in the art will recognize that the invention can be practiced with modification within the spirit and scope of the claims.

What is claimed is:

1. A method of cooling a gas turbine engine with compressor bleed air, the engine including a compressor rotor assembly and a turbine each rotatably coupled to a rotor shaft, the compressor rotor assembly including a centrifugal compressor and a cooling circuit, the centrifugal compressor including an impeller body and an impeller shroud, the centrifugal compressor including an inlet, an exit, and a hub extending therebetween, the impeller body including an opening disposed a distance from the impeller exit, the cooling circuit in flow communication with the impeller opening, said method comprising the steps of:
    operating the gas turbine engine; and
    cooling the turbine with pre-swirled bleed air supplied to the turbine from the compressor rotor assembly cooling circuit, the compressor rotor assembly cooling circuit in flow communication with the compressor rotor assembly impeller opening disposed a distance from the impeller exit wherein at least a portion of the bleed air is directed upstream axially towards the turbine.

2. A method in accordance with claim 1 wherein the compressor rotor assembly further includes a manifold in flow communication between the cooling circuit and the impeller opening, said step of cooling the turbine further comprising the step of extracting the bleed air from a manifold in flow communication with the impeller opening, the manifold positioned such that the bleed air is discharged from the impeller opening outwardly from the rotor shaft.

3. A method in accordance with claim 2 wherein said step of cooling the turbine further comprises the step of pre-swirling the bleed air prior to cooling the turbine.

4. A method in accordance with claim 3 wherein the cooling circuit includes an accelerator in flow communication between the cooling circuit and the turbine, said step of pre-swirling the bleed air further comprising the step of using the accelerator to pre-swirl the bleed air.

5. A compressor assembly for a gas turbine engine, the gas turbine engine including a turbine disposed downstream from said compressor assembly, said compressor assembly comprising:
    an impeller comprising an exit, an inlet, and a body extending therebetween, said impeller body comprising a first opening disposed a distance from said impeller exit; and
    a cooling circuit in flow communication with said impeller opening, said cooling circuit configured to deliver pre-swirled bleed air from said impeller first opening to the turbine wherein at least a portion of the bleed air is directed upstream axially towards the turbine.

6. A compressor assembly in accordance with claim 5 further comprising a manifold, said cooling circuit in flow communication with said manifold.

7. A compressor assembly in accordance with claim 6 wherein said manifold is in flow communication with said impeller first opening, said manifold disposed upstream from said impeller exit.

8. A compressor assembly in accordance with claim 6 wherein said turbine includes a rotor shaft, said compressor coupled to the rotor shaft, said impeller opening configured to discharge bleed air outwardly from the rotor shaft.

9. A compressor assembly in accordance with claim 8 further comprising an accelerator in flow communication with said cooling circuit.

10. A compressor assembly in accordance with claim 9 wherein said accelerator is configured to pre-swirl bleed air delivered to the turbine.

11. A compressor assembly in accordance with claim 10 wherein said impeller further comprises a second opening, said second opening disposed adjacent said impeller exit, said first opening upstream from said second opening.

12. A compressor assembly in accordance with claim 11 wherein said impeller first opening comprises a mid diffuser feed hole, said impeller second opening comprises a tip diffuser feed hole.

13. A rotor assembly for a gas turbine engine, said assembly comprising:
    a first rotor;
    a cooling circuit;
    a second rotor comprising an impeller comprising an exit, an inlet, and a body extending therebetween, said impeller body comprising a first opening disposed a distance from said impeller exit, said cooling circuit in flow communication with said impeller first opening and said first rotor, said cooling circuit configured to deliver pre-swirled bleed air from said second rotor impeller first opening to said first rotor wherein at least a portion of the bleed air is directed upstream axially towards said first rotor.

14. A rotor assembly in accordance with claim 13 wherein said second rotor further comprises a manifold, said cooling circuit in flow communication with said manifold.

15. A rotor assembly in accordance with claim 14 further comprising a rotor shaft, said first rotor coupled to said second rotor with said rotor shaft, said second rotor manifold in flow communication with said second rotor impeller first opening.

16. A rotor assembly in accordance with claim 15 wherein said second rotor impeller first opening is configured to discharge bleed air outwardly from said rotor shaft.

17. A rotor assembly in accordance with claim 16 wherein said cooling circuit comprises an accelerator in flow communication between said cooling circuit and said first rotor.

18. A rotor assembly in accordance with claim 17 wherein said cooling circuit accelerator is configured to pre-swirl bleed air delivered to said first rotor.

19. A rotor assembly in accordance with claim 18 wherein said second rotor impeller further comprises a second opening, said second opening disposed adjacent said impeller exit, said first opening upstream from said second opening.

20. A rotor assembly in accordance with claim 19 wherein said second rotor impeller first opening comprises a mid diffuser feed hole, said second rotor impeller second opening comprises a tip diffuser feed hole.

* * * * *